United States Patent
Lemaignan et al.

(10) Patent No.: US 8,359,129 B2
(45) Date of Patent: Jan. 22, 2013

(54) METHOD AND DEVICE FOR CONTROLLING THE THRUST OF A MULTI-ENGINE AIRCRAFT

(75) Inventors: Benoît Lemaignan, Toulouse (FR); Gérard Mathieu, Pibrac (FR)

(73) Assignee: Airbus Operations SAS, Toulouse (FR)

( * ) Notice: Subject to any disclaimer, the term of this patent is extended or adjusted under 35 U.S.C. 154(b) by 1210 days.

(21) Appl. No.: 12/162,774

(22) PCT Filed: Mar. 8, 2007

(86) PCT No.: PCT/FR2007/000415
§ 371 (c)(1), (2), (4) Date: Jul. 30, 2008

(87) PCT Pub. No.: WO2007/104851
PCT Pub. Date: Sep. 20, 2007

(65) Prior Publication Data
US 2009/0018714 A1    Jan. 15, 2009

(30) Foreign Application Priority Data
Mar. 15, 2006 (FR) .................................... 06 02249

(51) Int. Cl.
*G05D 1/00* (2006.01)

(52) U.S. Cl. ............... 701/8; 701/4; 701/14; 701/99; 701/100; 701/123; 340/963; 340/966; 244/76 R; 244/183; 244/184

(58) Field of Classification Search .............. 701/3, 4, 701/8, 14, 99, 100, 123; 340/963, 966; 244/76 R, 244/183, 184; 60/39.15
See application file for complete search history.

(56) References Cited

U.S. PATENT DOCUMENTS

| | | | | |
|---|---|---|---|---|
| 4,536,843 A | * | 8/1985 | Lambregts | 701/3 |
| 4,875,168 A | * | 10/1989 | Martin | 701/99 |
| 4,884,205 A | * | 11/1989 | Hernandez-Diaz | 701/99 |
| 4,935,682 A | * | 6/1990 | McCuen | 318/586 |
| 5,096,146 A | | 3/1992 | Orgun et al. | |
| 5,363,317 A | * | 11/1994 | Rice et al. | 702/34 |
| 5,440,490 A | * | 8/1995 | Summerfield | 701/100 |

(Continued)

FOREIGN PATENT DOCUMENTS
EP    0 471 395    2/1992
(Continued)

OTHER PUBLICATIONS
International Search Report dated Jun. 13, 2007 w/ English translation.
(Continued)

*Primary Examiner* — Thomas Black
*Assistant Examiner* — Peter D Nolan
(74) *Attorney, Agent, or Firm* — Dickinson Wright PLLC

(57) ABSTRACT

A method and device control the thrust of a multi-engine aircraft. At least one engine command is determined by a command determining unit, with the determined command commanding each engine that has not failed to deliver a thrust substantially equal to a reduced thrust value. A command application unit is configured to apply the determined command to each aircraft engine that has not failed. The reduced thrust value is determined, by a weight determining device, according to the current weight of the aircraft and according to a reduced thrust value FOEI, which is calculated by a thrust calculation unit.

7 Claims, 2 Drawing Sheets

U.S. PATENT DOCUMENTS

| | | | |
|---|---|---|---|
| 5,739,769 A * | 4/1998 | Vladimir et al. | 340/945 |
| 5,927,655 A * | 7/1999 | Larramendy et al. | 244/195 |
| 6,126,111 A * | 10/2000 | Burcham et al. | 244/76 R |
| 6,206,329 B1 * | 3/2001 | Gautier et al. | 244/221 |
| 6,453,221 B2 * | 9/2002 | Burson | 701/3 |
| 6,886,786 B1 * | 5/2005 | Huynh | 244/182 |
| 7,031,812 B1 * | 4/2006 | Pettigrew et al. | 701/14 |
| 8,025,503 B2 * | 9/2011 | Gates et al. | 434/35 |
| 2001/0032039 A1 | 10/2001 | Burson | |

FOREIGN PATENT DOCUMENTS

| | | |
|---|---|---|
| EP | 0 828 206 | 3/1998 |
| EP | 1 139 190 | 10/2001 |

OTHER PUBLICATIONS

Written Opinion of the ISA w/ English translation.

* cited by examiner

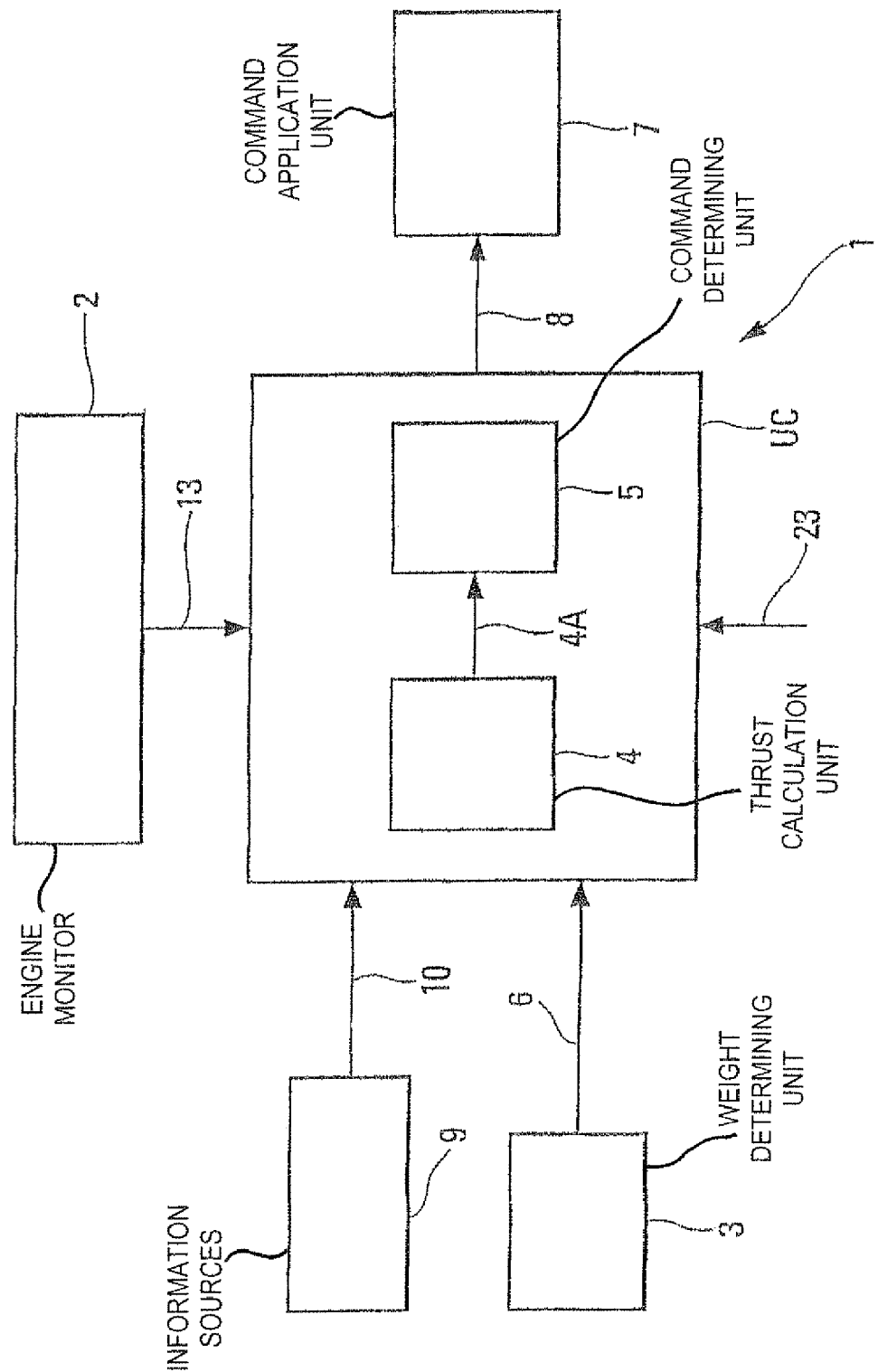

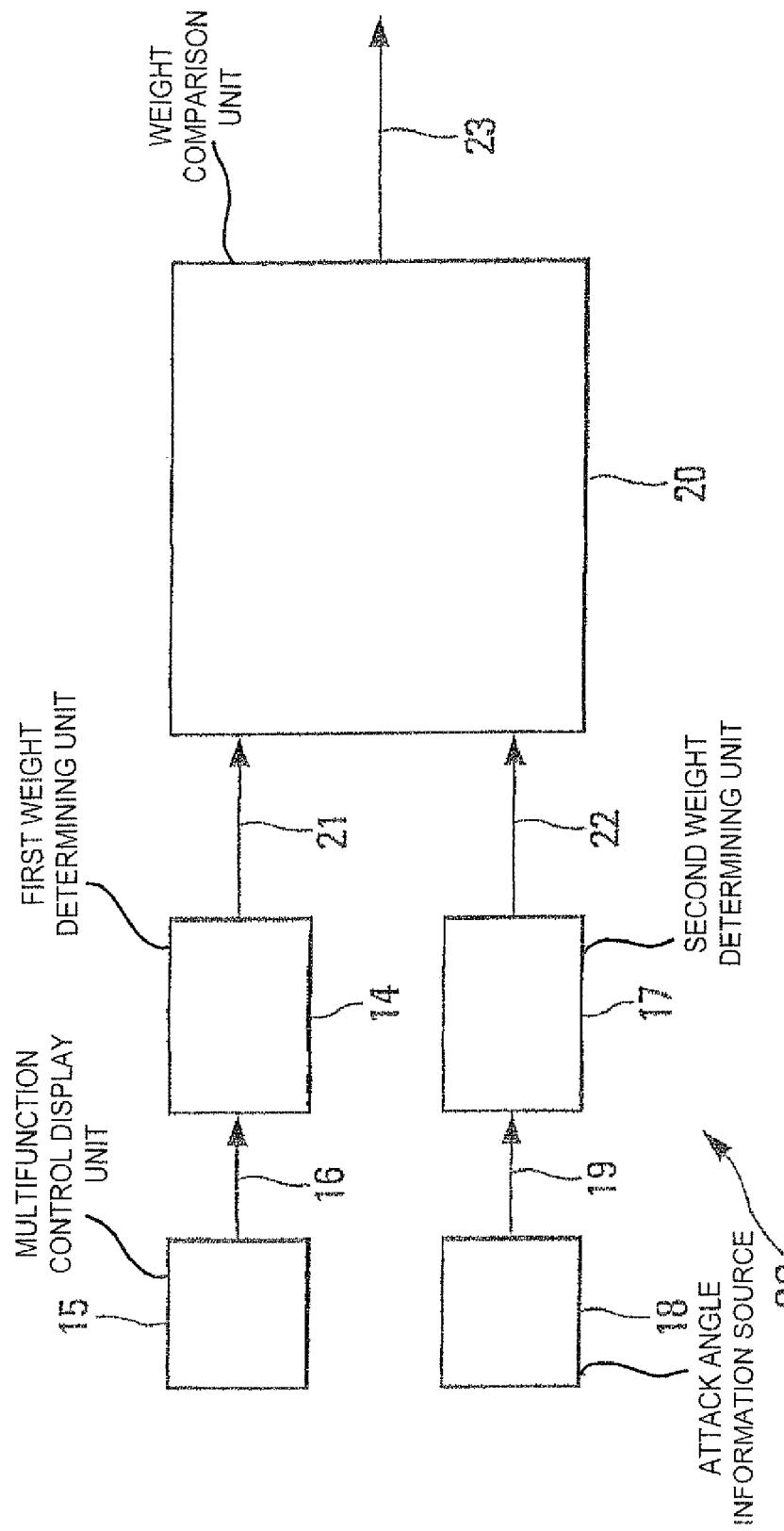

METHOD AND DEVICE FOR CONTROLLING THE THRUST OF A MULTI-ENGINE AIRCRAFT

FIELD OF THE INVENTION

The present invention relates to a method and device for controlling the thrust of an aircraft, particularly a transport airplane, of the multi-engine and particularly of the twin-engine, type.

BACKGROUND OF THE INVENTION

It is known that, in general, on an airplane, the vertical stabilizer (that is to say the fixed plane of the vertical empennage of the airplane, which is intended to provide the airplane with navigational stability) and the rudder (that is to say a moveable flap mounted on the vertical stabilizer and which can be maneuvered with a view to altering the direction of the airplane) have dimensions allowing the airplane fully to satisfy the various flight requirements (whether or not these be covered by regulations) such as, in particular, a minimal control speed of the VMC type for failure of one engine.

It is also known that in order to improve airplane performance (fuel consumption, noise levels, etc.) without reducing the payload, constructors have to reduce the mass of the airplane as far as possible, that is to say to reduce the mass of the structure, components, equipment, etc., and in particular the mass of said vertical stabilizer and of said rudder. However, reducing the dimensions of the vertical stabilizer and of the rudder for such purposes mechanically increases the aforementioned VMC speed, to the detriment of airplane performance, because when one engine fails, the minimal speed that has to be achieved is thus increased.

SUMMARY OF THE INVENTION

The present invention relates to a method for controlling the thrust of a multi-engine aircraft which makes it possible to remedy the aforementioned disadvantages.

To this end, according to the invention, said method is notable in that:
 a) a parameter representative of the current weight of the aircraft is determined and said current weight is deduced from this parameter. This parameter may be the current weight itself or the angle of attack, for example;
 b) a reduced thrust value is calculated which is proportional to said current weight determined in step a);
 c) at least one engine command is determined, which command is such that, if applied to those engines of said aircraft that have not failed, these engines deliver a thrust substantially equal to said reduced thrust value calculated in step b); and
 d) said command determined in step c) is applied to those engines of the aircraft that have not failed.

The method according to the present invention may be applied to an aircraft for which all the engines are operational. However, in a preferred embodiment, the engines of the aircraft are monitored in such a way as to be able to detect a failure of one of said engines, and steps a) and d) are performed only when a failure of one of the engines is detected.

Thus, by virtue of the invention, when one of the aircraft engine fails, the thrust of the engine(s) that has(have) not failed is reduced (as a function of the weight of the aircraft) in such a way as to reduce the gradient, while at the same time guaranteeing a gradient that is steep enough and also consistent, thus avoiding unusual flight attitudes if the aircraft is called upon to go around when its mass is light. As a result, by reducing the yaw moment of that or those engine(s) that has or have not failed, the theoretical minimal control speed VMC is reduced for all aircraft weights. Thus, it is possible to balance the aircraft in terms of yaw without having to have the rudder hard over. That means that the speed will not be limited by the minimal speed VMC. Thus, the performance constraints due to the minimal control speed for failure of one engine are more relaxed and the full benefit of the longitudinal performance of the aircraft can be enjoyed by reducing its flight speed if necessary.

As a result, an aircraft that implements the method according to the invention greatly reduces the limitations on performance due to minimal speed VMC. The various aforementioned flight requirements can thus be achieved irrespective of the weight of the aircraft irrespective of its speed. This is, in particular, especially advantageous in the case of a twin-engine aircraft. This is because, in a twin-engine aircraft, the thrust of one single engine needs to be able to provide a regulatory minimal gradient at high mass. The result of this is that, at low mass, the thrust available on a single engine is greater than the thrust needed to achieve the regulatory gradient.

Furthermore, the method according to the invention also allows the gradient and the attitude to be evened out if the aircraft is called upon to go around, especially with all its engines operational.

In a preferred embodiment, in step b) the reduced thrust value FOEI is calculated using the following expression:

$$FOEI = m.g.(\gamma cons + 1/f)$$

in which:
 m.g. is said current weight, m being the mass and g the acceleration due to gravity;
 γcons is a gradient value corresponding to a reference gradient; and
 f is the current ratio between the lift and the drag of the aircraft.

In this preferred embodiment, said gradient value γcons is calculated using the following expression:

$$\gamma cons = \gamma min + \Delta\gamma$$

in which:
 γmin is a regulatory minimal gradient value for the aircraft; and
 Δγ is a predetermined gradient value, for example a few degrees.

Furthermore, in a particular embodiment, in step a) the current weight of the aircraft is determined by summing the weight of the aircraft without fuel and the (current) weight of fuel present on board said aircraft.

In this case, advantageously, during an approach phase, the following operations are also performed:
 prior to step d):
  a first aircraft weight value is determined by summing the weight of the aircraft without fuel and the weight of fuel present on board said aircraft;
  a second weight value is determined as a function of the current angle of attack of the aircraft;
  said first and second weight values are compared with one another; and
 in step d):
  if said first and second weight values are equal, give or take a margin, then said command determined in step c) is applied to those engines which have not failed in order to obtain a thrust substantially equal to the reduced thrust value calculated in step b); and if said first and second weight values are different, (by more than said margin) a command is applied to those engines which have not failed in order to obtain a constant predetermined thrust, for example a thrust of the TOGA type (where TOGA is the universally acknowledged abbreviation for the English-language expression "Take Off/Go Around").

Thus, when the current weight (namely said first weight value) which is determined using the weight of fuel available on board the aircraft and which is used to determine the aforementioned reduced thrust value differs from a (second) weight value calculated as a function of the current angle of attack, said reduced thrust value according to the invention is not applied. This is because, in such a case, the weight value obtained from the angle of attack is generally precise which means that the current weight determined in step a) is probably in error, thus leading to an erroneous value for the reduced thrust value calculated in step b) and for the command determined in step c) of the method according to the invention.

The present invention also relates to a device for controlling the thrust of a multi-engine aircraft, particularly a multi-engine transport airplane and especially a twin-engine airplane.

According to the invention, said device of the type preferably comprising means for monitoring the engines of said aircraft so as to be able to detect a failure of one of said engines,
is notable in that it additionally comprises:
a first means for determining a parameter representative of the current weight of the aircraft and for deducing said current weight from this;
a second means for calculating a reduced thrust value which is proportional to said current weight determined by said first means;
a third means for determining at least one engine command which is such that, if applied to those engines that have not failed, these engines deliver a thrust substantially equal to said reduced thrust value calculated by said second means; and
a fourth means for applying said command determined by said third means to those engines of the aircraft that have not failed.

The device according to the invention thus makes it possible, when an engine fails, to adapt the thrust of that or those engine(s) that has or have not failed so as to exhibit sufficient performance but with a lower minimal control speed (of the VMC type) and a more consistent flight attitude.

BRIEF DESCRIPTION OF THE DRAWINGS

The figures of the attached drawing make it easy to understand how the invention may be embodied. In these figures, identical references denote elements which are similar.

FIG. 1 is a block diagram of a control device according to the invention.

FIG. 2 schematically illustrates a particular improvement to a control device according to the invention.

DETAILED DESCRIPTION OF THE INVENTION

The device 1 according to the invention and depicted schematically in FIG. 1 is intended to control the thrust of a multi-engine aircraft, particularly a multi-engine transport airplane, not depicted.

Although not exclusively, said device 1 applies more particularly to a twin-engine airplane and is preferably used at least during an approach phase with a view to landing on a runway.

Furthermore, more specifically, said device 1 is intended to be implemented when one of the engines (not depicted) of said multi-engine aircraft fails. To do this, said device 1 comprises customary means 2 which are intended to monitor the engines of the aircraft so as to be able to detect failure of one of said engines.

According to the invention, said device 1 additionally comprises:
a means 3 for determining a parameter representative of the current weight of the aircraft and for deducing said current weight from this. This parameter may be directly the current weight or angle of attack, for example, that will make it possible to determine the current weight using a customary lift equation;
a means 4 for calculating a reduced thrust value which is proportional to the current weight determined by said means 3;
a means 5 which is connected via a link 4A to said means 4 and which is formed in such a way as to determine at least one engine command. This command is such that, if applied to that or those engine(s) of the aircraft that has (have) not failed, this (these) engine(s) will deliver a thrust substantially equal to said reduced thrust value calculated by said means 4. In one particular embodiment, said means 4 and 5 form part of a central control unit UC which is, for example, connected via a link 6 to said means 3 and via a link 13 to said means 2; and
a customary means 7, which is connected via a link 8 to said central control unit UC and which is formed in such a way as to apply said command determined by the means 5 to that (those) aircraft engine(s) that has (have) not failed. This customary means 7 may, for example, provide a command to a full authority digital engine control system of the FADEC type (FADEC being the universally acknowledged acronym for the English-language expression "Full Authority Digital Engine Control").

Thus, when one of the aircraft engines fails, the device 1 according to the invention reduces the thrust (and does so as a function of the weight of the aircraft) of that or those engine(s) that remain functional so as to reduce the gradient of said aircraft while at the same time guaranteeing sufficient gradient to perform the planned maneuvers. As a result, by reducing the yaw moment of that or those engine(s) that has (have) not failed, the theoretical minimum control speed VMC is reduced for all aircraft weights. Thus it is possible to balance the aircraft in terms of yaw without having to have the rudder hard over. That means that the speed will not be limited by the minimal speed VMC. Thus, the constraints on performance that are due to the minimal control speed for when one engine has failed are more relaxed, and the full benefit of the longitudinal performance of the aircraft can be enjoyed by reducing its flight speed if necessary.

As a result, an aircraft using the device 1 according to the invention greatly reduces the limits on performance due to the minimal speed VMC. Various flight requirements can thus be achieved irrespective of the weight of the aircraft and irrespective of its speed. This is particularly advantageous in a twin-engine aircraft.

Furthermore, the device 1 according to the invention also has the advantage that it can be used even when all the aircraft engines are operational, to make the attitude more consistent, to protect the engines and therefore reduce damage thereto, this in particular affording savings in terms of maintenance costs.

In a preferred embodiment, the means 4 calculates the reduced thrust value FOEI using the following relationship:

$$FOEI = m.g.(\gamma cons + 1/f)$$

in which:
- m.g. is said current weight, m being the mass and g the acceleration due to gravity;
- γcons is a gradient value corresponding to a reference gradient; and
- f is the current ratio between the lift and the drag of the aircraft.

In this preferred embodiment, said means 4 also calculates said gradient value γcons and also using the following expression:

$$\gamma cons = \gamma min + \Delta\gamma$$

in which:
- γmin is a regulatory minimal gradient value for the aircraft; and
- Δγ is a predetermined gradient value, for example 0.5°.

Said device 1 also comprises a collection 9 of information sources which is connected via a link 10 to said central control unit UC and which is capable of supplying the latter with the values of a plurality of parameters, particularly said aforementioned current ratio f.

In one particular embodiment, said device 1 additionally comprises a control system SC depicted schematically in FIG. 2. This control system SC which is preferably used during approach with a view to landing comprises, in particular:
- a means 14 which is, for example, similar to said means 3 or corresponds to this means 3 and which is formed in such a way as to determine a first aircraft weight value. To do this, said means 14 (like the means 3) sums the weight of the aircraft without fuel and the weight of fuel present on board the aircraft. In the usual way, the weight of the aircraft without fuel is determined by the pilot and is input by the latter into the device 1 using a customary input means 15, particularly a multifunction control and display unit of the MCDU type (where MCDU is the universally recognized abbreviation for the English-langue expression "Multifunction Control Display Unit") which is connected via a link 16 to said means 14;
- a means 17 which in the usual way determines a second weight value as a function of the current angle of attack of the aircraft and which is, for example, received from a customary means 18, the latter being connected via a link 19 to said means 17. This means 18 may form part of said collection 9 of information sources. In addition, said means 17 comprises a customary model used to determine said second weight value from the lift equation, for example, based on a measurement of the flight angle of attack. The mass can be deduced from this by correlating it with speed; and
- a means 20 which is connected via links 21 and 22 to said means 14 and 17 and which is intended to compare said first and second weight values with one another and to issue a command on the strength of this comparison.

According to the invention, the purpose of said means 20 is to inhibit the application of the aforementioned reduced thrust value to that (those) engine(s) that has (have) not failed when said first and second weight values differ from one another. To do this, said means 20 may, for example, transmit an inhibit command to said central control unit UC via a link 23.

Thus, by virtue of said control system SC:
- if the first and second weight values are equal (to give or take a margin, for example a few percent of the current mass) then the device 1 applies said command to that (those) engine(s) that has (have) not failed in order to obtain a thrust substantially equal to the reduced thrust value calculated by the means 4; and
- if said first and second weight values differ from one another (by more than said margin), then the device 1 applies a customary command to that (those) engine(s) that has (have) not failed in order to obtain a constant predetermined thrust, for example a TOGA type thrust (where TOGA is the universally acknowledged abbreviation for the English-language expression "Take Off/Go Around").

As a result, when the current weight (namely said first weight value) which is determined by the means 14 using the weight of fuel available on board the aircraft and which is used to determine the aforementioned reduced thrust value differs from a weight value calculated by the means 17 as a function of the current angle of attack, the device 1 according to the invention does not apply said reduced thrust value because during an approach (during which said control system SC is preferably activated), the weight value obtained from the angle of attack is generally precise which means that the current weight determined by the means 14 and 3 is then probably in error leading to an erroneous value of the reduced thrust value calculated by the means 4 and of the command determined by the means 5.

The invention claimed is:

1. A method for controlling the thrust of a multi-engine aircraft, said method comprising:
    c) determining at least one engine command, by a command determining unit, wherein said at least one engine command commands each engine of said aircraft that has not failed to deliver a thrust substantially equal to a reduced thrust value; and
    d) applying, by a command application unit, said command determined in step c) to each of the engines of the aircraft that has not failed,
        wherein, said reduced thrust value determined in step c) is determined according to:
        a) a parameter representative of current weight of the aircraft, in which said parameter is determined by a weight determining device; and
        b) a reduced thrust value FOEI, which is calculated by a thrust calculation unit, by way of a reduced thrust value, proportional to said current weight, according to the following expression:

$$FOEI = m.g.(\gamma cons + 1/f)$$

in which:
- m.g. is said current weight, wherein m is mass and g acceleration due to gravity;
- γcons is a gradient value corresponding to a reference gradient; and
- f is a current ratio between lift and drag of the aircraft.

2. The method as claimed in claim 1, wherein, while the aircraft is in flight, the engines of said aircraft are monitored by an engine monitor to detect a failure of one of said engines, and steps a) and d) are performed only when a failure of one of said engines is detected.

3. The method as claimed in claim 1, wherein:
said gradient value γcons is calculated according to the following expression:

$$\gamma cons = \gamma min + \Delta\gamma$$

in which: γmin is a regulatory minimal gradient value for the aircraft; and

Δγ is a predetermined gradient value.

4. The method as claimed in claim 1, wherein in step a) the current weight of the aircraft is determined by a first weight determining unit configured to sum the weight of the aircraft without fuel and the weight of fuel present on board said aircraft.

5. The method as claimed in claim 1, wherein, during an approach phase, the method further comprises:

prior to step d):

determining, by a first weight determining unit, a first aircraft weight value by summing the weight of the aircraft without fuel and the weight of the aircraft with fuel present on board said aircraft;

determining, by a second weight determining unit, a second weight value as a function of a current angle of attack of the aircraft;

comparing said first and second determined weight values with one another; and in step d):

applying, by said command application unit, if said first and second weight values are substantially equal, then said command determined by said command determining unit to each of the engines which has not failed to deliver a thrust substantially equal to the reduced thrust value calculated in step b); and applying, by said command application unit, if said first and second weight values are different from one another, a command, determined by said command determining unit, that commands each of the engines which has not failed to deliver a constant predetermined thrust.

6. A device for controlling the thrust of a multi-engine aircraft, said device comprising:

a command determining unit configured to determine at least one engine command, wherein said at least one engine command commands each engine that has not failed to deliver a thrust substantially equal to a reduced thrust value;

a command application unit configured to apply said command determined by said command determining unit to each of the engines of the aircraft that has not failed, a weight determining device configured to determine a parameter representative of current weight of the aircraft; and a thrust calculation unit configured to calculate, by way of reduced thrust value, a reduced thrust value FOEI which is proportional to said current weight, according to the following expression:

$$FOEI = m.g.(\gamma cons + 1/f)$$

in which:

m.g. is said current weight, wherein m is being the mass and g acceleration due to gravity;

γcons is a gradient value corresponding to a reference gradient; and f is a current ratio between lift and drag of the aircraft.

7. An aircraft, comprising the device of claim 6.

* * * * *